United States Patent
Yamaoka et al.

(10) Patent No.: US 6,898,443 B2
(45) Date of Patent: May 24, 2005

(54) PORTABLE TELEPHONE DEVICE

(75) Inventors: Michiyuki Yamaoka, Katano (JP); Masahide Akao, Kyotanabe (JP)

(73) Assignee: Sanyo Electric Co., Ltd., Osaka (JP)

( * ) Notice: Subject to any disclaimer, the term of this patent is extended or adjusted under 35 U.S.C. 154(b) by 473 days.

(21) Appl. No.: 10/084,393

(22) Filed: Feb. 27, 2002

(65) Prior Publication Data

US 2002/0119806 A1 Aug. 29, 2002

(30) Foreign Application Priority Data

Feb. 28, 2001 (JP) ........................................ 2001-055708

(51) Int. Cl.$^7$ .............................................. H04M 1/00
(52) U.S. Cl. ...................................... 455/566; 455/574
(58) Field of Search .................. 455/575.1–4, 566–567, 455/574, 90.1–3, 414.1; 379/433.01, 433.04; 345/102

(56) References Cited

U.S. PATENT DOCUMENTS

| 6,029,072 A | * | 2/2000 | Barber ........................ 455/557 |
| 6,119,023 A | * | 9/2000 | Tomiyori .................... 455/574 |
| 6,131,046 A | * | 10/2000 | Sano et al. ................. 455/566 |
| 6,278,887 B1 | * | 8/2001 | Son et al. ................... 455/566 |
| 6,317,614 B1 | * | 11/2001 | Okada ........................ 455/574 |
| 6,725,064 B1 | * | 4/2004 | Wakamatsu et al. ........ 455/566 |

FOREIGN PATENT DOCUMENTS

| JP | 2000036637 A | 2/2000 |
| JP | 2001027981 A | 1/2001 |

* cited by examiner

Primary Examiner—Vivian Chin
Assistant Examiner—Tuan Tran

(57) ABSTRACT

While the backlight is lit, if the control unit detects key input concerning a request instruction from a user by the request instruction signal from the operation unit, the control unit outputs the lights-out instruction signal to the display lighting unit to turn off the backlight, and outputs the detected request instruction signal to the communication unit. The communication unit transmits the request instruction signal to the server via the base station. If the server responses the request instruction signal and distributes the contents information to the communication unit via the base station, and the communication unit outputs the contents information within the waiting time, the control unit reproduces the contents information, outputs the reproduced contents information to the display unit to display the contents information on the display panel in the display unit, and outputs the light-up instruction signal to the display lighting unit to turn on the backlight.

8 Claims, 2 Drawing Sheets

… (1) Field of the Invention

The present invention relates to portable telephone devices and in particular to portable telephone devices equipped with a lighting device for better viewability of a display panel in a dark place.

(2) Description of the Related Art

Generally, portable telephone devices are equipped with a lighting device at a display panel and an operation unit for better operability in the nighttime or dark places. These lighting devices have a function of lighting up the display panel or the like for a predetermined period of time in response to users' key operations. This function is effective also when making use of a contents information distribution service in the open air and nighttime. With the contents information distribution service, users can make a request for contents information on news, weather forecasts, or the like, from a server and receive the contents information distributed from the server.

Note here that a server denotes all information disseminating servers such as a Web server, mail server, and data base server, which are connected with a network capable of two-way communication (e.g., the Internet) and a communication terminal equipment such as a portable telephone device, can make a request for information and receive the same through the server.

In the above case, upon receipt of an instruction for requesting distribution of contents information through key operation by a user, the lighting device lights up the display panel in a portable telephone device for a given period of time. Therefore, when the portable telephone device receives the contents information distributed from the server, the user can see the display panel and recognize that the requested contents information has been received even in the dark at nighttime.

However, if requests for contents information from many users' portable telephone devices are made for the server at a same time, standby time for connecting with the server would be longer, and therefore it takes a long time to receive the requested contents information from the server. Such a case causes a problem that the portable telephone device cannot receive the contents information within the given period of time for lighting up the display panel, but at the time when the contents information is received, the lighting has gone out. This leads to the situation where the user cannot read the contents information even though the contents information is displayed on the display panel.

SUMMARY OF THE INVENTION

In view of the above-described problem, the object of the invention is to provide a portable telephone device by which, when a user makes use of the contents information distribution service, a period of time for lighting up the display panel can be adjusted as convenient for the user.

(1) To achieve the above object, the portable telephone device according to the invention which receives contents information distributed from a server in response to a request made by a user for the contents information, the portable telephone device may include: a display panel which displays the received contents information thereon; a backlight which lights up the display panel; a request detecting unit for detecting that the request has been made; and a lighting control unit for (a) turning off the backlight when the request detecting unit detects that the request has been made and (b) turning on the backlight after the contents information is received.

With this construction, after the contents information distributed from the server has been received in the user's portable telephone device, the backlight at the display panel is turned on. Therefore, the user can recognize that the information is displayed even in the nighttime or dark places. In addition, the backlight is not lit until the information is displayed on the display panel, which prevents the battery from being unnecessarily consumed.

(2) Here, in above (1), the lighting control unit may turn on the backlight when the lighting control unit detects completion of a display procedure for displaying the received contents information on the display panel.

(3) In above (2), the display procedure may display a portion of the received contents information on the display panel.

(4) Additionally, in above (3), the request detecting unit may include an instruction accepting unit for accepting from the user an instruction for requesting the contents information and detect that the request has been made by detecting the instruction.

(5) Further, in above (3), the request detecting unit may include an instruction accepting unit for accepting from the user an instruction for requesting the contents information and detect that the request has been made by detecting transmission of the instruction.

With these constructions, after the contents information distributed from the server has been displayed on the display panel of the user's portable telephone device, the backlight at the display panel is turned on. Therefore, the user can immediately recognize that the information is displayed even in the nighttime or dark places. In addition, the backlight is not lit until the information is displayed on the display panel, which prevents the battery from being unnecessarily consumed.

(6) Here, in above (4) and (5), the lighting control unit may include reception judgment unit for judging whether the contents information is received within a predetermined period of time since the request detecting unit detects that the request has been made, and in the case where the reception judgment unit may judge that the contents information is not received within the predetermined period of time, the lighting control unit displays on the display panel a message that the contents information failed to be received and turns on the backlight.

(7) In above (2), the display procedure may display all of the received contents information on the display panel, the request detecting unit may include an instruction accepting unit for accepting from the user an instruction for requesting the contents information and detect that the request has been made by detecting the instruction, and the lighting control unit may include reception judgment unit for judging whether the contents information is received within a predetermined period of time since the request detecting unit detects that the request has been made, and in the case where the reception judgment unit may judge that the contents information is not received within the predetermined period of time, the lighting control unit displays on the display panel a message that the contents information failed to be received and turns on the backlight.

(8) Alternatively, in above (2), the display procedure may display all of the received contents information on the display panel, the request detecting unit may include an instruction accepting unit for accepting from the user an instruction for requesting the contents information and detect that the request has been made by detecting transmission of the instruction, and the lighting control unit may include reception judgment unit for judging whether the contents information is received within a predetermined period of time since the request detecting unit detects that the request has been made, and in the case where the reception judgment unit may judge that the contents information is not received within the predetermined period of time, the lighting control unit displays on the display panel a message that the contents information failed to be received and turns on the backlight.

With these constructions, in the case that the user cannot receive the requested contents information from the server for some reason, the user can recognize such a situation.

(9) Here, in above (2), the display procedure may display all of the received contents information on the display panel.

(10) In above (9), the request detecting unit may include an instruction accepting unit for accepting from the user an instruction for requesting the contents information and detect that the request has been made by detecting the instruction.

(11) Further, in above (9), the request detecting unit may include an instruction accepting unit for accepting from the user an instruction for requesting the contents information, and detect that the request has been made by detecting transmission of the instruction.

With these constructions, after the information requested by the user is completely displayed on the display panel, the backlight is turned on. Therefore, the user can immediately see the distributed information without the battery being unnecessarily consumed.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

A portable telephone device according to the invention controls ON/OFF of the lighting in the display panel. More specifically, the portable telephone device controls the lighting to be turned OFF when the portable telephone device waits for the contents information distributed from the server, because a user does not need to see the display panel during this waiting time. While, the portable telephone device turns ON the lighting when the contents information is distributed and displayed on the display panel.

The portable telephone device according to the invention is provided with a display panel, a backlight that lights up the display panel, functions of transmitting/receiving data, a browser (i.e., software for browsing data described in a HTML language or the like), and so on.

Figure 1:
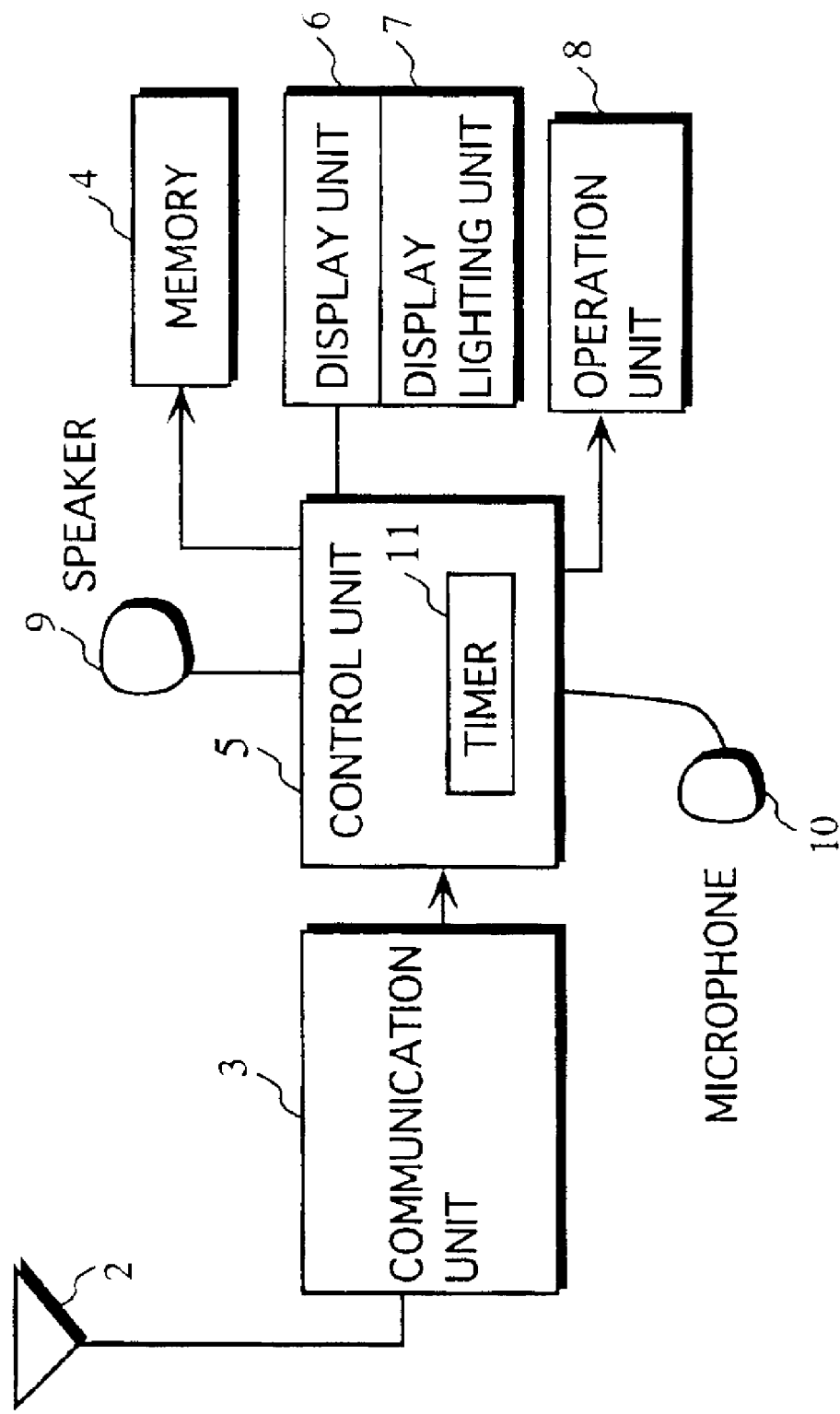
FIG. 1 shows the construction of a portable telephone device 1 according to one embodiment of the invention.

FIG. 1 shows the construction of the portable telephone device 1 according to this embodiment. As shown in this figure, the portable telephone device 1 is composed of an antenna 2, an operation unit 8, a communication unit 3, a memory 4, a control unit 5, a display unit 6, a display lighting unit 7, a speaker 9, a microphone 10, and a timer 11.

The operation unit 8 accepts an instruction for requesting contents information from the server (hereafter called a "request instruction") according to key input by a user. The operation unit 8 outputs the accepted request instruction to the control unit 5 as a request instruction signal.

In addition, the operation unit 8 accepts key inputs concerning a given lighting period of time, waiting time for response, and the like, and outputs a key input signal corresponding to each of the key inputs to the control unit 5.

Note here that, in order to distinguish the request instruction signal from the other key input signals, "key input signals" mentioned below do not include the request instruction signal.

The above-mentioned "given lighting period of time" denotes a time period for lighting the backlight in the display lighting unit 7.

The above-mentioned "waiting time for response" denotes the maximum time period for keeping the portable telephone device 1 waiting for the contents information. More specifically, the waiting time for response is the maximum time period for keeping the control unit 5 waiting for requested contents information output from the communication unit 3 since the control unit 5 detected the request instruction signal output from the operation unit 8. After this waiting time has passed, the control unit 5 has the display unit 6 display a reception error message which will be described later.

The communication unit 3 transmits the request instruction signal output from the control unit 5 to the server via a base station. Moreover, the communication unit 3 receives, via the antenna 2, signals containing the contents information distributed from the server via the base station according to the transmitted request instruction signal. Then, the communication unit 3 demodulates the received signals to output them to the control unit 5.

The memory 4 stores the given lighting period of time, the waiting time for response, the reception error information, the contents information, and the like.

Reception error information is data for displaying the reception error message. The reception error information is read out and reproduced by the control unit 5, and then output to the display unit 6. For example, with this information, a massage message "Requested information failed to be received from the server. Please retry it after a while." is displayed on the display.

The control unit 5 is equipped with the timer 11 for controlling ON/OFF of the backlight. Concrete procedures by the control unit 5 will be given below.

On detecting a key input signal output from the operation unit 8, the control unit 5 outputs a light-up instruction signal to the display lighting unit 7. Then, the control unit 5 reads out data on the given lighting period of time from the memory 5, starts the timer 11 to measure the elapsed time so as to light the backlight until the given lighting period of time has passed.

While the backlight is lit, if the control unit 5 receives a request instruction signal from the operation unit 8, the control unit 5 outputs a lights-out instruction signal to the display lighting unit 7 to turn off the backlight. Then, after outputting the request instruction signal to the communication unit 3, the control unit 5 reads out data on the waiting time for response from the memory 4, starts the timer 11 to measure the elapsed waiting time. If the communication unit 3 does not output the contents information within the waiting time for response, the control unit 5 reads out the reception error information from the memory 4, reproduces the reception error message, and outputs the message to the display unit 6 to display the message. Then, the control unit 5 outputs a light-up instruction signal to the display lighting unit 7 to turn on the backlight.

Alternatively, if the communication unit 3 outputs the contents information within the waiting time for response, the control unit 5 reproduces the contents information, outputs the reproduced contents information to the display unit 6 to display the contents information, and outputs the light-up instruction signal to the display lighting unit 7 to turn on the backlight.

The display unit 6 displays the contents information and the reception error message, which are output from the control unit 5, on the display panel.

The display lighting unit 7, on detecting the light-up instruction signal output from the control unit 5, turns on the backlight to light up the display panel in the display unit 6. While, on detecting the lights-out instruction signal, the display lighting unit 7 turns off the backlight.

Figure 2:
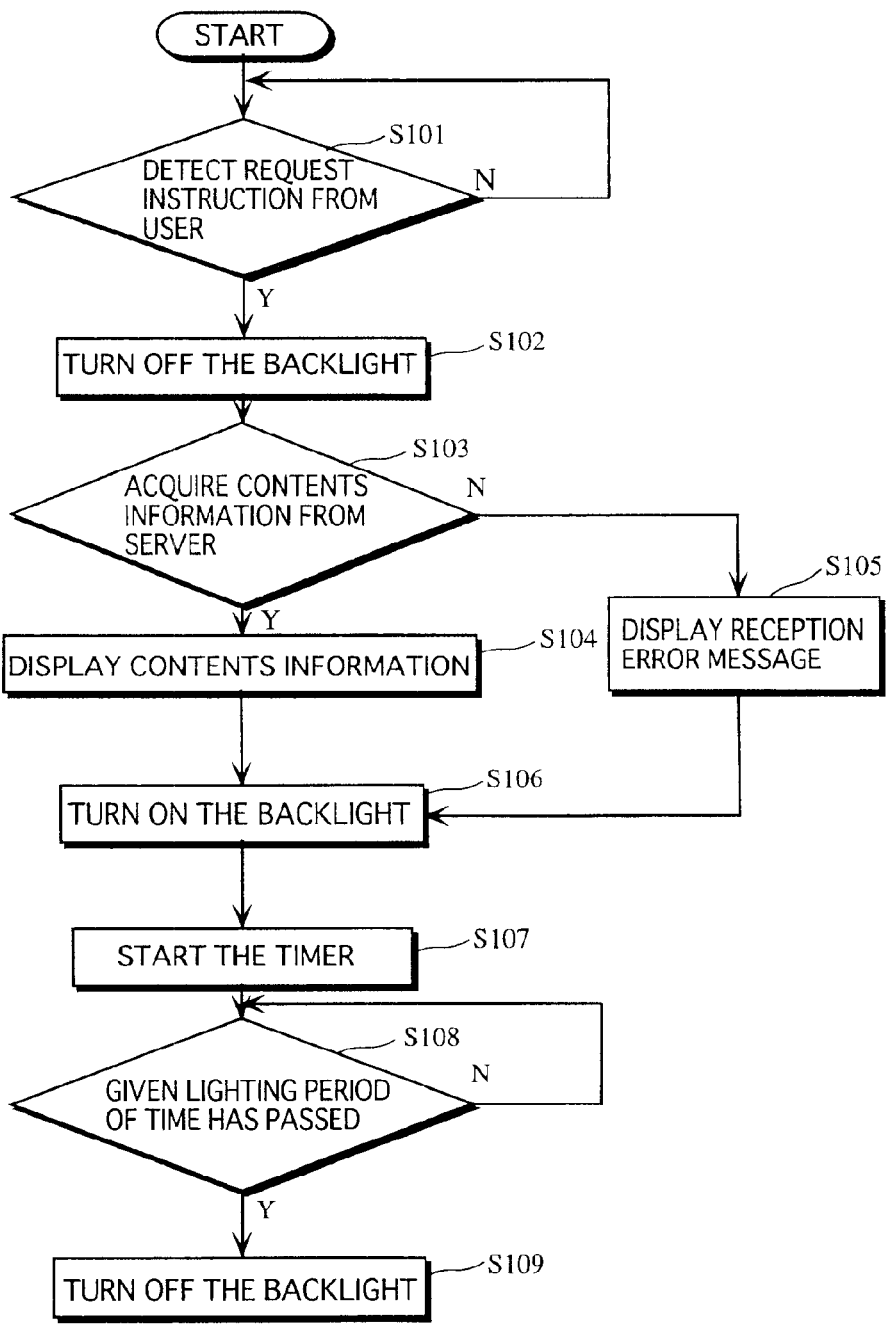
FIG. 2 is a flowchart showing the backlight ON/OFF control procedure by the control unit 5.

Following describes a procedure for controlling ON/OFF of the backlight by the control unit 5 in the case where the request instruction signal is output. FIG. 2 is a flowchart showing the backlight ON/OFF control procedure by the control unit 5.

While the backlight is lit, if the control unit 5 detects key input concerning a request instruction from a user by the request instruction signal output from the operation unit 8 (S101), the control unit 5 outputs the lights-out instruction signal to the display lighting unit 7 to turn off the backlight (S102), and outputs the detected request instruction signal to the communication unit 3.

The communication unit 3 transmits the output request instruction signal to the server via the base station.

In the case that the server responses to the request instruction signal and distributes the contents information to the communication unit 3 via the base station, and the communication unit 3 outputs the contents information within the waiting time for response (S103:Y), the control unit 5 reproduces the output contents information, outputs the reproduced contents information to the display unit 6 so as to display the contents information on the display panel in the display unit 6 (S104), and outputs the light-up instruction signal to the display lighting unit 7 so as to turn on the backlight (S106).

Meanwhile, in the case that the communication unit 3 does not output the contents information within the waiting time for response (S103:N), the control unit 5 reads out the reception error information from the memory 4, reproduces the reception error message, outputs the reproduced reception error message to the display unit 6 so as to display the output reception error message on the display panel in the display unit 6 (S105). Then, the control unit outputs the light-up instruction signal to the display lighting unit 7 so as to turn on the backlight (S106). Further, the control unit 5 starts the timer 11 (S107) so as to measure the elapsed lighting time. When the given lighting period of time has passed (S108), the control unit 5 turns off the backlight (S109).

While the present invention has been explained by way of the embodiment given above, it should be obvious that the invention is not limited to the details given therein.

In the above embodiment, at the steps S101 and S102 in the flowchart shown in FIG. 2, the control unit 5 detects the key input concerning the request instruction from the user and turns off the backlight by the request instruction signal output from the operation unit 8. However, instead of detecting the user's key input by the request instruction signal output from the operation unit 8, the control unit 5 may detect the notification from the communication unit 3 that the request instruction signal has been transmitted and turn off the backlight. Alternatively, when the control unit 5 outputs the request instruction signal from the user to the communication unit 3, the control unit 5 may turn off the backlight.

In the above embodiment, at the steps S104 and S106 in the flowchart shown in FIG. 2, the control unit 5 may output the light-up instruction signal to the display lighting unit 7 at any of the following timings: (a) when the control unit 5 starts to make the display unit 6 display the contents information (e.g., when the first letter is displayed on the panel), (b) while the control unit 5 makes the display unit 6 display the contents information (e.g., in the case that the contents information consists of pictures and text information, at the time when only the text information is displayed), or (c) after the contents information has been displayed on the display panel in the display unit 6 (i.e., the control unit 5 completes outputting the contents information to the display unit 6).

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A portable telephone device which receives contents information distributed from a server in response to a request made by a user for the contents information, the portable telephone device comprising:

a display panel which displays the received contents information thereon;

a backlight which lights up the display panel;

a request detecting means for detecting that the request has been made;

a reception judgment means for judging whether the contents information is received within a predetermined period of time since the request detecting means detects that the request has been made;

a display control means for (a) in a case where the contents information is received, displaying on the display panel the received contents information when the contents information is received, and (b) in a case where the contents information failed to be received, displaying on the display panel a message indicating that that contents information failed to be received when the predetermined period of time has elapsed; and a lighting control means for (a) in the case where the contents information is received, turning off the backlight after the request detecting means detects that the request has been made until the contents information is displayed and turning on the backlight when the contents information is displayed and (b) in the case where the contents information failed to be received, turning off the backlight after the request detecting means detects that the request has been made until the message is displayed and turning on the backlight when the message is displayed.

2. The portable telephone device of claim 1, wherein
the lighting control means turns on the backlight when the lighting control means detects completion of a display procedure for displaying the received contents information on the display panel.

3. The portable telephone device of claim 2, wherein
the display procedure displays a portion of the received contents information on the display panel.

4. The portable telephone device of claim 3, wherein
the request detecting means includes an instruction accepting unit for accepting from the user an instruction for requesting the contents information, and detects that the request has been made by detecting the instruction.

5. The portable telephone device of claim 3, wherein
the request detecting means includes an instruction accepting unit for accepting from the user an instruction for requesting the contents information, and detects that the request has been made by detecting transmission of the instruction.

6. The portable telephone device of claim 2, wherein
the display procedure displays all of the received contents information on the display panel.

7. The portable telephone device of claim 6, wherein
the request detecting means includes an instruction accepting unit for accepting from the user an instruction for requesting the contents information, and detects that the request has been made by detecting the instruction.

8. The portable telephone device of claim 6, wherein
the request detecting means includes an instruction accepting unit for accepting from the user an instruction for requesting the contents information, and detects that the request has been made by detecting transmission of the instruction.

* * * * *